Nov. 6, 1951  L. J. VERVILLE ET AL  2,573,939
AUTOMATIC LOCKING MEANS FOR ROTARY DRIVEN MEMBERS
Filed Oct. 24, 1949  2 SHEETS—SHEET 1
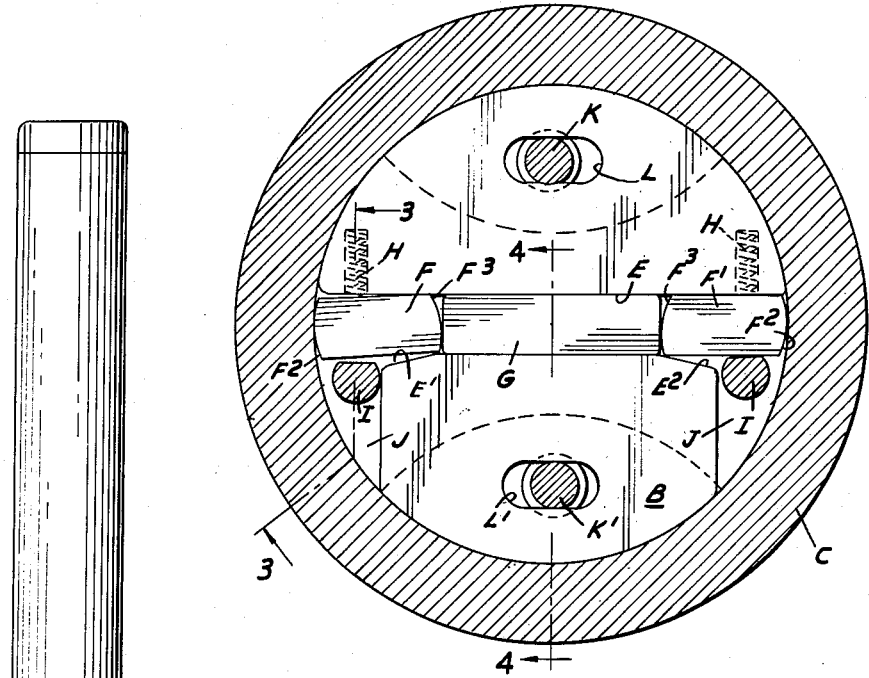
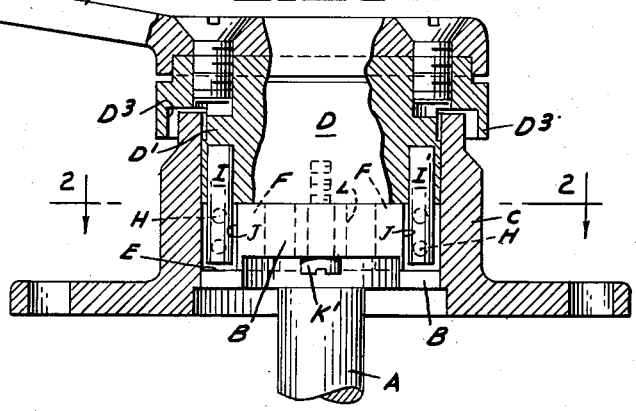
INVENTOR.
LLOYD J. VERVILLE
FRED F. MILLER JR.
BY
ATTORNEYS

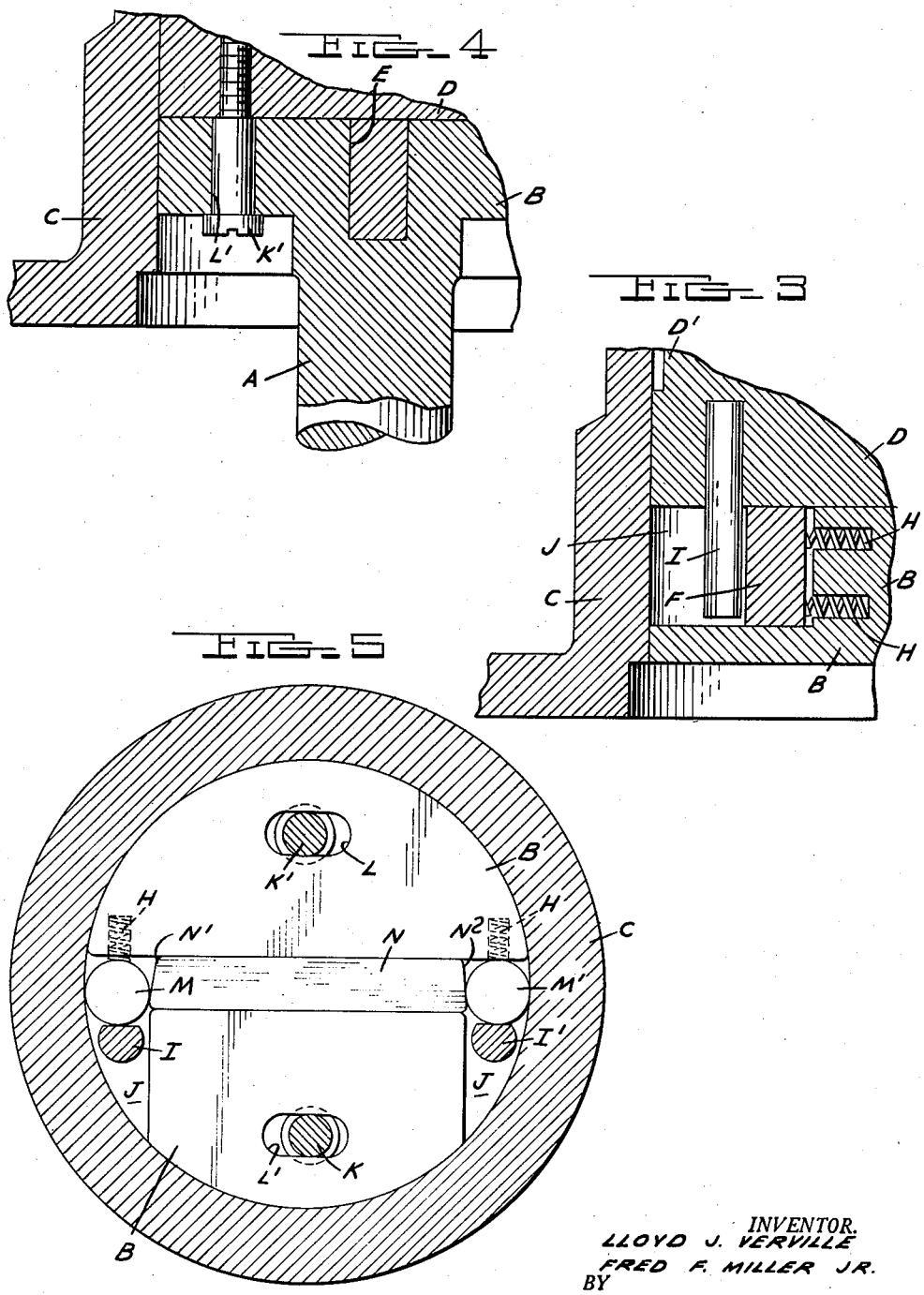

Patented Nov. 6, 1951

2,573,939

UNITED STATES PATENT OFFICE 2,573,939

AUTOMATIC LOCKING MEANS FOR ROTARY DRIVEN MEMBERS

Lloyd J. Verville, Detroit, and Fred F. Miller, Jr., Berkley, Mich., assignors to The Gear Grinding Machine Company, Detroit, Mich., a corporation of Michigan Application October 24, 1949, Serial No. 123,262

6 Claims. (Cl. 192—8)

The invention relates to locking means for rotary driven members which, while permitting free rotation thereof in either direction when actuated by a driving member, will automatically lock against movement under load whenever the driving torque is released.

It is the object of the invention to obtain a simple construction of locking means which can be readily applied to any rotary driven member, and which will exert no detrimental stress thereon.

To this end the invention consists first in a construction in which the locking elements are contained within the rotary driven member in cooperative relation with a surrounding stationary member.

Second, in a construction in which the locking elements are contained and freely movable with the rotary driven member into locking engagement with a surrounding stationary member to resist torque stresses from the driven member in either direction.

Third, in a construction as just described, together with a driving member having a lost motion connection with the driven member and means actuated during the taking up of this lost motion for releasing the locking engagement of said locking elements with said stationary member.

Fourth, in the more specific construction as hereinafter set forth.

In the drawings:

Fig. 1 is a sectional side elevation of a mechanism embodying our improved automatic locking means;

Fig. 2 is a section on line 2—2, Fig. 1, illustrating the locking elements within the rotary driven member and the surrounding stationary member;

Fig. 3 is a section on line 3—3, Fig. 2; and

Fig. 4 is a section on line 4—4, Fig. 2;

Fig. 5 is a view similar to Fig. 2 showing a modified construction.

The driven member A may be of any construction which is provided with a circular head B at the end thereof enclosed within a stationary annular member C secured to some fixed support. The driving member D has a portion D' fitting within the annular members C and an external portion D² which, as shown, is a hand actuated crank arm. There is also an annular flange D³ depending from the external portion to surround the upper end of the annular member C.

The head B is formed with a slot E extending diametrically thereacross and in this slot are placed a pair of locking members F and F' and an intermediate spacer member G. As illustrated in Figs. 1 to 4, the locking members are sprags which have eccentric arcuate end surfaces F², F³. Thus a slight rotation of either sprag in one direction will move the surface F² into frictional engagement with the inner surface of the annular member C and simultaneously through the intermediate spacer member G will press the other sprag into frictional engagement with the diametrically opposite surface of the member C. This frictional engagement will effectively lock the head B to the stationary annular member C. The sprag F will be moved into frictional engagement by a rotation thereof in one direction, while the sprag F' will be frictionally engaged by a rotation in the opposite direction. Each of the sprags has an energizing means consisting of a spring H arranged in a socket in the member B to bear against the adjacent face of the sprag to move it into locking engagement. Consequently, with the structure as thus far described, the member B will be locked from rotation in either direction.

To permit rotation of the member B by the actuating member D, there is a lost motion torque transmitting connection between said members and also means for rotating the sprags oppositely from the direction in which they are moved by the springs H. As specifically shown, the torque transmitting means is also the sprag actuating means, both functions being performed by pins or posts I and I' extending from the driving member D into a recess J in the driven member and adjacent to the sprag on the side thereof opposite to the spring. In normal position when the driving member is not being actuated, the posts I provide a slight clearance for the sprags over that required for the movement thereof into locking engagement under the actuation of the springs H. However, if the actuating member is rotated in either direction it will first take up the slight clearance and then actuate the sprag in its path to turn it into released position. Such operation of only one of the sprags will release both inasmuch as the only abutment for the inner end of each sprag is the spacer member G, which is freely movable in the slot E. Consequently rotation of the actuating member D counterclockwise, as illustrated in Fig. 2 and indicated by the arrow, will bring the post I' against the sprag F' and move it into releasing position.

This will permit further rotation of the member D and through the post I' and sprag F' will transmit torque to the member B to rotate the latter. If on the other hand the actuating member D is moved in a clockwise direction, the post I will similarly engage the sprag F releasing the locking engagement and permitting the rotation of the member A in this direction. In either case when the driving force of the member D is released, one or the other of the springs H will move the adjacent sprag into locking position, which will transmit locking pressure through the spacer G to the opposite sprag. Both sprags will therefore be frictionally locked to the stationary member C but they will exert no stress upon the member B other than resistance to a torque stress from said member.

To permit of the free turning of the sprags F and F' into locking engagement, the slot E has flaring portions E' and E² at opposite ends thereof, which are adjacent to the recesses J into which the post I and I' extend. The driven member B is connected to the driving member D by shoulder bolts K and K' on opposite sides of the slot E, said bolts passing through slotted apertures L and L' in the head B to permit the necessary lost motion between the members D and B to release the locking engagement.

In the modified construction illustrated in Fig. 5, the locking means are formed by rollers M and M' and the intermediate spacer member N has its opposite ends N', N² oppositely inclined to form wedge engagement with the rollers. The energizing springs H and the posts I and I' are the same as in the construction previously described.

What we claim as our invention is:

1. A rotary driven member having a channel therein extending diametrically thereacross, a stationary member provided with a circular inner face surrounding said driven member, locking means in opposite end portions of said channel directly contacting the adjacent inner face of said stationary member to lock said driven member against rotation respectively in opposite directions, a floating intermediate member in said channel between said locking means and contacting therewith with its opposite ends for transmitting the reaction of one to the other, a driving member for rotating said driven member, and means actuated by the initial movement of said driving member in either direction of rotation for contacting with and releasing the locking means opposing rotation of the driven member in the same direction.

2. A rotary driven member having a channel therein extending diametrically thereacross, a stationary member provided with a circular inner face surrounding said driven member, locking means in opposite end portions of said channel in cooperative relation with the inner face of said stationary member to lock said driven member against rotation respectively in opposite directions, resilient energizing means for normally holding each locking means in contact with the inner face of said driven member, a floating member in said channel intermediate said locking means for transmitting the reaction of one to the other and to said stationary member, a driving member for rotating said driven member, and means actuated by the initial movement of said driving member in either direction of rotation for releasing the locking means opposing rotation of said driven member in the same direction.

3. A rotary driven member having a channel therein extending diametrically thereacross, a stationary member provided with a circular inner face surrounding said driven member, locking means in opposite end portions of said channel in cooperative relation to the inner face of said stationary member for locking said driven member against rotation respectively in opposite directions, resilient energizing means for each locking means, a floating member in said channel intermediate said locking means for transmitting the reaction of one to the other and to said stationary member, a rotary driving member having a lost motion torque transmitting connection with said driven member, and means actuated by said driving member while taking up the lost motion in either direction of rotation for releasing the locking means opposing rotation of the driven member in the same direction.

4. A rotary driven member having a circular head with a groove therein extending diametrically thereacross, a stationary member provided with a circular inner face surrounding said driven member, locking means in opposite end portions of said groove and directly contacting the adjacent inner face of said stationary member to lock said driven member from rotation respectively in opposite directions, a floating member within said groove intermediate said locking means and contacting therewith with its opposite ends for transmitting the reaction of one to the other and to said stationary member, a rotary driving member coaxial with said driven member having projections extending into proximity to the respective locking means to contact with and release the same during initial movement of said driving member in either direction of rotation, each of said projections also constituting a torque transmitting coupling between said driving and driven members.

5. A rotary driven member having a circular head with a groove therein extending diametrically thereacross and with a recess adjacent to each end portion of said groove, a stationary member provided with a circular inner face surrounding said driven member, sprags in opposite end portions of said groove and in cooperative relation to said stationary member to lock said driven member from rotation respectively in opposite directions, a resilient energizing means for each sprag, a floating member within said groove intermediate said sprags for transmitting the reaction of one to the other and to said stationary member, a rotary driving member coaxial with said driven member, and posts projecting from said driving member respectively into said recesses in proximity to the sprag therein, whereby the initial rotation of said driving member in either direction will through one or the other of said posts turn the corresponding sprag to release the locking of said driven member and to transmit torque thereto.

6. A rotary driven member having a channel therein extending diametrically thereacross and with enlarged recesses at opposite ends thereof, a stationary member provided with a circular inner face surrounding said driven member, rollers in said recesses, a floating intermediate member between said rollers having its opposite ends forming oppositely inclined faces cooperating with the respective rollers and the surrounding member to lock said driven member against rotation respectively in opposite directions, said intermediate member also transmitting the reaction of each roller to the other, resilient energizing means for pressing said rollers against said inclined faces, a driving member for rotating said driven member, and means actuated by the initial movement of said driving member in either direction of rotation for releasing the roller opposing rotation of the driven member in the same direction.

LLOYD J. VERVILLE.
FRED F. MILLER, JR.

REFERENCES CITED

The following references are of record in the file of this patent:

UNITED STATES PATENTS

| Number | Name | Date |
|---|---|---|
| 1,835,349 | Smith | Dec. 8, 1931 |
| 2,031,186 | Still | Feb. 18, 1936 |
| 2,359,010 | Smith | Sept. 26, 1944 |
| 2,447,167 | Davis et al. | Aug. 17, 1948 |